United States Patent
Lei

(10) Patent No.: US 12,279,308 B2
(45) Date of Patent: Apr. 15, 2025

(54) RESOURCE CONFLICT PROCESSING METHOD AND DEVICE, STORAGE MEDIUM, TERMINAL, AND BASE STATION

(71) Applicant: SPREADTRUM SEMICONDUCTOR (NANJING) CO., LTD., Jiangsu (CN)

(72) Inventor: Zhenzhu Lei, Shanghai (CN)

(73) Assignee: SPREADTRUM SEMICONDUCTOR (NANJING) CO., LTD., Jiangsu (CN)

(*) Notice: Subject to any disclaimer, the term of this patent is extended or adjusted under 35 U.S.C. 154(b) by 508 days.

(21) Appl. No.: 17/763,889

(22) PCT Filed: Aug. 13, 2020

(86) PCT No.: PCT/CN2020/108764
§ 371 (c)(1),
(2) Date: Mar. 25, 2022

(87) PCT Pub. No.: WO2021/057303
PCT Pub. Date: Apr. 1, 2021

(65) Prior Publication Data
US 2022/0417995 A1    Dec. 29, 2022

(30) Foreign Application Priority Data
Sep. 25, 2019   (CN) .......................... 201910912942.X

(51) Int. Cl.
*H04W 74/0816*    (2024.01)
(52) U.S. Cl.
CPC .............................. *H04W 74/0816* (2013.01)

(58) Field of Classification Search
CPC ................................................ H04W 74/0816
See application file for complete search history.

(56) References Cited

U.S. PATENT DOCUMENTS

| 12,096,508 B2 * | 9/2024 | Kim ...................... H04L 5/0064 |
| 2010/0034126 A1 | 2/2010 | Kitazoe et al. |

(Continued)

FOREIGN PATENT DOCUMENTS

| CN | 104602283 A | 5/2015 |
| CN | 106332118 A | 1/2017 |

(Continued)

OTHER PUBLICATIONS

English translation for WO_2019141231_A1_I (Year: 2019).*

(Continued)

*Primary Examiner* — Chi H Pham
*Assistant Examiner* — Weibin Huang
(74) *Attorney, Agent, or Firm* — CANTOR COLBURN LLP

(57) ABSTRACT

A resource conflict processing method and device, a storage medium, a terminal, and a base station are provided. The method includes: determining whether a Preconfigure Uplink Resource (PUR) search space window and a SS block based RRM Measurement Timing Configuration (SMTC) overlap in time domain; and in response to the PUR search space window and the SMTC overlapping in time domain, transmitting uplink data to be transmitted through a PUR associated with the PUR search space window when there is uplink data to be transmitted; or, in response to the (Continued)

PUR search space window and the SMTC overlapping in time domain, performing a measurement in the SMTC according to a measurement requirement.

20 Claims, 5 Drawing Sheets

(56) References Cited

U.S. PATENT DOCUMENTS

| | | | |
|---|---|---|---|
| 2018/0368034 A1 | 12/2018 | Lin et al. | |
| 2019/0182900 A1 | 6/2019 | Cui et al. | |
| 2019/0239106 A1 | 8/2019 | Cui et al. | |
| 2019/0274146 A1 | 9/2019 | Tang et al. | |
| 2019/0349797 A1* | 11/2019 | Lin | H04W 24/10 |
| 2020/0022011 A1* | 1/2020 | Lee | H04W 24/10 |
| 2020/0280957 A1* | 9/2020 | Gao | H04W 72/0446 |
| 2020/0314777 A1* | 10/2020 | Liu | H04W 72/53 |
| 2020/0383085 A1* | 12/2020 | Shih | H04W 56/005 |
| 2021/0022143 A1* | 1/2021 | Xiong | H04L 5/10 |
| 2022/0104306 A1* | 3/2022 | Shrestha | H04L 1/1812 |

FOREIGN PATENT DOCUMENTS

| | | | |
|---|---|---|---|
| CN | 109699067 A | 4/2019 | |
| CN | 109803376 A | 5/2019 | |
| CN | 109804649 A | 5/2019 | |
| CN | 110167134 A | 8/2019 | |
| CN | 110602794 A | 12/2019 | |
| JP | 2011530895 A | 12/2011 | |
| WO | WO-2019141231 A1 * | 7/2019 | H04W 24/00 |

OTHER PUBLICATIONS

3GPP TSG RAN WG1 Meeting #96bis, R1-1904343 Xi'an, China, Apr. 8-12, 2019 Source: ZTE Title: Support for transmission in preconfigured UL resources for MTC (Year: 2019).*

Huawei, "Feature lead summary of Support for transmission in preconfigured UL resources"; 3GPP TSG RAN WG1 Meeting #97, R1-1907573; May 13-17, 2019; 23 pages.

International Search Report for International Application No. PCT/CN2020/108764; Mailing Date: Nov. 10, 2020.

Lenovo, Motorola Mobility, "UL transmission in preconfigured resources for NBIoT"; 3GPP TSG RAN WG1 Meeting #97, R1-1906280; May 13-17, 2019; 5 pages.

ZTE, "Support for transmission in preconfigured UL resources for MTC"; 3GPP TSG RAN WG1 Meeting #97, R1-1906496; May 13-17, 2019; 13 pages.

MCC Support, "Final Report of 3GPP TSG RAN WG1 #96v2.0.0"; 3GPP TSG RAN WG1 Meeting #96bis, R1-1905837; Apr. 8-12, 2019, 155 pages.

JPO Office Action for corresponding JP Application No. 2022-519077; Issued on May 9, 2023.

LG Electronics, "Discussion on preconfigured UL resources in NB-IoT", 3GPP TSG RAN WG1 #98, R1-1908529, Aug. 26-30, 2019, 6 pages.

LG Electronics, "Remaining issues on downlink control channel", 3GPP TSG RAN WG1 Meeting #94, R1-1808490, Aug. 20-24, 2018, 9 pages.

ZTE, "Support for transmission in preconfigured UL resources for MTC", 3GPP TSG RAN WG1 Meeting #96bis, R1-1904343, Apr. 8-12, 2019, 12 pages.

* cited by examiner

RESOURCE CONFLICT PROCESSING METHOD AND DEVICE, STORAGE MEDIUM, TERMINAL, AND BASE STATION

CROSS-REFERENCE TO RELATED APPLICATIONS

This is the U.S. national stage of application No. PCT/CN2020/108764, filed on Aug. 13, 2021. Priority under 35 U.S.C. § 119(a) and 35 U.S.C. § 365(b) is claimed from Chinese Application No. 201910912942.X, filed Sep. 25, 2019, and entitled "RESOURCE CONFLICT PROCESSING METHOD AND DEVICE, STORAGE MEDIUM, TERMINAL, AND BASE STATION," the disclosure of which is also incorporated herein by reference.

TECHNICAL FIELD

The present disclosure generally relates to communication technology field, and more particularly, to a method and device for processing a resource conflict, a storage medium, a terminal, and a base station.

BACKGROUND

In the Fifth-Generation mobile communications (5G) New Radio (NR) system, a User Equipment (UE) needs to transfer from an idle state to a connected state when the UE transmits uplink data or downlink data in the idle state of a Radio Resource Control (RRC).

Currently, there is a method for the UE to transmit a small amount of uplink data in the idle state directly, that is, a network configures a dedicated and periodic Preconfigure Uplink Resource (PUR) and a corresponding downlink search space window for the UE, so that the UE can transmit the uplink data through the PUR, and can monitor a Physical Downlink Control Channel (PDCCH) in the downlink search space window for receiving the downlink data.

When applying the PUR search space window, there is a need to solve a problem that the resource used by the PUR search space window conflicts with other resources.

SUMMARY

Embodiments of the present disclosure provide a method for processing a time domain conflict between a Preconfigure Uplink Resource (PUR) search space window and a SS block based RRM Measurement Timing Configuration (SMTC).

In an embodiment of the present disclosure, a method for processing a resource conflict is provided, the method includes: determining whether a PUR search space window and a SMTC overlap in time domain; and in response to the PUR search space window and the SMTC overlapping in time domain, transmitting uplink data to be transmitted through a PUR associated with the PUR search space window when there is uplink data to be transmitted; or, in response to the PUR search space window and the SMTC overlapping in time domain, performing a measurement in the SMTC according to a measurement requirement.

In an embodiment of the present disclosure, a method for processing a resource conflict is provided, the method includes: determining whether a PUR search space window and a SMTC overlap in time domain; and in response to the PUR search space window and the SMTC overlapping in time domain, allowing a terminal to transmit uplink data to be transmitted through a PUR associated with the PUR search space window; or, in response to the PUR search space window and the SMTC overlapping in time domain, allowing the terminal to perform a measurement in the SMTC according to a measurement requirement.

In an embodiment of the present disclosure, a non-transitory storage medium is provided, the non-transitory storage medium storing one or more programs, the one or more programs including computer instructions, which, when executed by a processor, cause the processor to: determine whether a PUR search space window and a SMTC overlap in time domain; and in response to the PUR search space window and the SMTC overlapping in time domain, transmit uplink data to be transmitted through a PUR associated with the PUR search space window when there is uplink data to be transmitted; or, in response to the PUR search space window and the SMTC overlapping in time domain, perform a measurement in the SMTC according to a measurement requirement.

DETAILED DESCRIPTION

Figure 1:
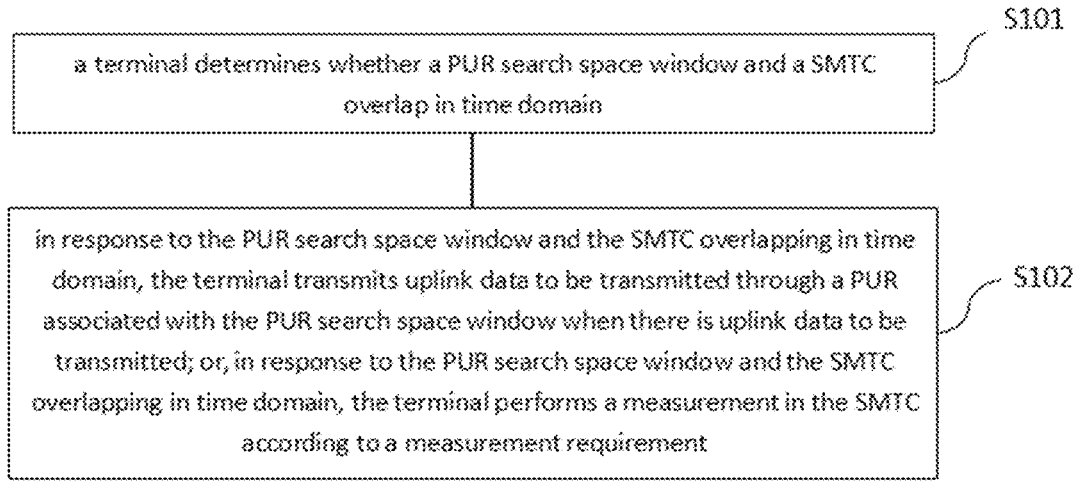
FIG. 1 schematically illustrates a flowchart of a method for processing a resource conflict according to an embodiment of the present disclosure.

As mentioned in background, in the existing technology, there is a need for a method for processing a resource conflict.

In the NR, a UE may use a Discontinuous Reception (DRX) in a RRC idle state and inactive state to reduce power consumption. The UE may listen to a Paging Occasion (PO) in each DRX period. Since the NR introduces an operation of beam management, a length of a single PO is one beam scanning period, the same paging message is repeatedly transmitted in all beams in the scanning mode, and a selection of beam for receiving paging message depends on the UE. One paging frame is one radio frame and may contain one or more POs, and even a paging frame is a starting point of one PO. The determination of a paging frame is similar to the method of calculating in the Long Term Evolution (LTE).

Currently, in the NR system, if a UE wants to transmit uplink/downlink data in an idle/inactive state, the UE needs to enter the connected state through a random access procedure before transmitting the uplink/downlink data, and "/" means or. This data transmission mechanism in the idle/inactive state increases a RRC signaling overhead and UE energy consumption, and also increases a data transmission delay.

For reducing the RRC signaling overhead and the UE energy consumption caused by transmitting the uplink data in the idle state from the UE, in the Narrow Band Internet of things (NB-IOT) system, an Early Data Transmission (EDT) is introduced. A nature of the EDT transmission mechanism is that when the UE initiates a random access, the UE uses a Message3 (Msg3) to carry the uplink data to transmit uplink data, thereby preventing the UE from entering the connected state. For the uplink data transmission in the idle state, the method effectively reduces the RRC signaling overhead and the UE energy consumption, and reduces the UE transmission delay at the same time. However, due to a limited number of bits that the Msg3 can carry, the method can only upload some small uplink data packets.

For further reducing the RRC signaling overhead and the UE energy consumption caused by transmitting the uplink data in the idle state from the UE, a periodic Preconfigure Uplink Resource (PUR) is introduced in the NB-IOT, the UE may directly transmit the uplink data in the PUR and receive retransmission scheduling information or acknowledgment information in a corresponding PUR search space window, such as ACKnowledgement/Non-ACKnowledgement (ACK/NACK), thereby preventing the UE from initiating a random access into the connected state.

However, in an idle/inactive state, a UE may autonomously perform an intra-frequency/inter-frequency measurement activity according to a measurement criteria, and "/" means or. The UE needs to adjust a radio frequency to other frequency points when the UE performs the inter-frequency measurement, and the UE cannot receive or transmit data. When a search space window associated with the PUR conflicts with the radio frequency measurement adjusted by the UE in time domain, that is, a downlink search space window corresponding to the PUR and a SS block based RRM Measurement Timing Configuration (SMTC) overlap in time domain, the UE cannot receive or transmit data at the same time. Meanwhile, the UE cannot receive information such as ACK/NACK or retransmission scheduling, which means that the PUR cannot be used for the data transmission.

Since a measurement activity of a UE is completely autonomous in an idle or inactive state, a network cannot know when the UE performs an intra-frequency/inter-frequency measurement activity. Therefore, when the PUR search space window conflicts with the measurement activity of the UE, the UE cannot transmit and receive data when performing the measurement, and the configured PUR under this condition is a waste of resource.

In embodiments of the present disclosure, a method for determining an access resource is provided, including: determining whether a PUR search space window and a SMTC overlap in time domain; and in response to the PUR search space window and the SMTC overlapping in time domain, transmitting uplink data to be transmitted through a PUR associated with the PUR search space window when there is uplink data to be transmitted; or, in response to the PUR search space window and the SMTC overlapping in time domain, performing a measurement in the SMTC according to a measurement requirement.

According to the embodiment of the present disclosure, if the PUR search space window and the SMTC are determined to overlap in time domain, the embodiment of the present disclosure either abandons the SMTC measurement process overlapping with the PUR search space window in time domain when a terminal has uplink data, or releases the PUR associated with the PUR search space window. In this way, the conflict between the PUR search space window and the SMTC can be avoided, which reduces a waste of the PUR.

In order to clarify the object, characteristic and advantages of embodiments of the present disclosure, the embodiments of present disclosure will be described clearly in detail in conjunction with accompanying drawings.

When configuring a PUR and a PUR search space window associated with the PUR for the UE, those skilled in the art have not considered the problem that a resource used by the PUR search space window may conflict with other downlink resources. After careful research, the inventor of the present disclosure found that the PUR search space window may overlap with a SMTC in time domain. When the PUR search space window overlaps with the SMTC in time domain, problems such as resource conflict may occur.

FIG. 1 schematically illustrates a flowchart of a method for processing a resource conflict according to an embodiment of the present disclosure, the method may be applied at a terminal side, such as a NR UE. Specifically, the method for processing a resource conflict may include S101 and S102.

In S101, a terminal determines whether a PUR search space window and a SMTC overlap in time domain.

In S102, in response to the PUR search space window and the SMTC overlapping in time domain, the terminal transmits uplink data to be transmitted through a PUR associated with the PUR search space window when there is uplink data to be transmitted; or, in response to the PUR search space window and the SMTC overlapping in time domain, the terminal performs a measurement in the SMTC according to a measurement requirement.

More specifically, in S101, after determining a time domain position of the PUR search space window and a time domain position of the SMTC, the UE may determine whether the PUR search space window and the SMTC overlap in time domain. If the PUR search space window does not overlap with the SMTC in time domain, the UE may upload data normally based on the PUR.

In S102, if the PUR search space window and the SMTC overlap in time domain, the UE may transmit the uplink data to be transmitted through the PUR associated with the PUR search space window when there is uplink data to be transmitted; or, if the PUR search space window and the SMTC overlap in time domain, the UE may perform a measurement in the SMTC according to the measurement requirement.

According to a specific implementation, if the UE has the uplink data to be transmitted, the UE may use the PUR associated with the PUR search space window to transmit the uplink data to be transmitted, and does not perform the measurement in the SMTC time window overlapping with the PUR search space window in time domain. If the UE does not have the uplink data to be transmitted, the UE can determine whether to perform the measurement according to the measurement requirement, and when the measurement is required, the UE may perform the measurement in the SMTC time window overlapping with the PUR search space window in time domain.

According to a specific implementation, if a protocol stipulates that the UE can perform the measurement according to the measurement requirement within the SMTC time window overlapping with the PUR search space window in time domain, so that the UE may perform the measurement in the SMTC time window according to the measurement requirement, and determine that the PUR associated with the PUR search space window is an invalid resource. Further, the UE and the network side may release the PUR. For example, the network side allows the UE to perform the measurement according to the measurement requirement within the SMTC time window overlapping with the PUR search space window in time domain. Therefore, if the UE needs to perform the measurement under this condition, the measurement may be performed within the SMTC time window overlapping with the PUR search space window in time domain.

According to a variant embodiment, if the PUR search space window and the SMTC overlap in time domain, and an intra-frequency/inter-frequency measurement condition is satisfied, the UE may transmit uplink data to be transmitted through a PUR associated with the PUR search space window and an intra-frequency/inter-frequency measurement cannot be performed when there is uplink data to be transmitted.

If the PUR search space window and the SMTC overlap in time domain and the intra-frequency/inter-frequency measurement condition is not satisfied, the UE may transmit uplink data to be transmitted through a PUR associated with the PUR search space window and perform a measurement of a serving cell in the SMTC.

If the PUR search space window and the SMTC overlap in time domain, and the intra-frequency/inter-frequency measurement condition is satisfied, but the UE does not have uplink data to be transmitted, the UE may perform the measurement of the serving cell in the SMTC according to the measurement requirement, and/or, perform the intra-frequency/inter-frequency measurement.

According to another embodiment, if the intra-frequency/inter-frequency measurement condition is satisfied, the UE may transmit indication information to a base station at the network side. By the received indication information, the base station at the network side can know that the UE may perform the intra-frequency/inter-frequency measurement during the SMTC overlapping with the PUR search space window in time domain. Wherein, the indication information is used for indicating that the terminal performs the intra-frequency/inter-frequency measurement.

After that, if the PUR search space window and the SMTC overlap in time domain, and the intra-frequency/inter-frequency measurement condition is satisfied, the UE may perform the measurement in the SMTC time window according to the measurement requirement.

According to another embodiment, the network side may transmit configuration information of the PUR to the UE, the configuration information includes a measurement gap, the measurement gap includes at least one SMTC. After receiving the configuration information, the UE may know a time domain position of the measurement gap. In this case, if the PUR search space window and the measurement gap overlap in time domain, the UE may perform the measurement during the SMTC according to the measurement requirement. In addition, the UE may determine that the PUR associated with the PUR search space window is an invalid resource which can be released.

Figure 2:
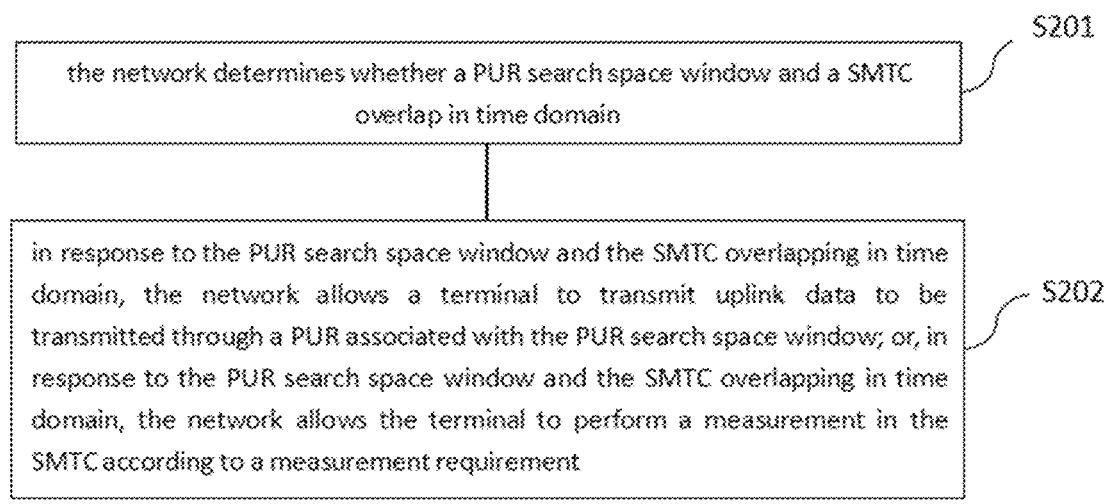
FIG. 2 schematically illustrates a flowchart of a method for processing a resource conflict according to another embodiment of the present disclosure.

FIG. 2 schematically illustrates a flowchart of a method for processing a resource conflict according to another embodiment of the present disclosure, the method may be applied at a network side, such as a base station at the network side. Specifically, the method for processing a resource conflict may include S201 and S202.

In S201, the network determines whether a PUR search space window and a SMTC overlap in time domain.

In S202, in response to the PUR search space window and the SMTC overlapping in time domain, the network allows a terminal to transmit uplink data to be transmitted through a PUR associated with the PUR search space window; or, in response to the PUR search space window and the SMTC overlapping in time domain, the network allows the terminal to perform a measurement in the SMTC according to a measurement requirement.

More specifically, in S201, a base station at the network side may determine whether the PUR search space window and the SMTC overlap in time domain. If the PUR search space window and the SMTC do not overlap in time domain, according to the prior art solution, the PUR can be used for transmitting the uplink data, and the PUR search space window can be used for transmitting the downlink data. During the SMTC, the UE may perform the measurement according to the measurement requirement.

If the PUR search space window and the SMTC overlap in time domain, in S202, the base station at the network may allow the UE to transmit the uplink data through the PUR associated with the PUR search space window; or, if the PUR search space window and the SMTC overlap in time domain, the base station at the network may allow the UE to perform the measurement in the SMTC according to the measurement requirement.

According to a specific implementation, when the base station at the network side allows the terminal to perform the measurement in the SMTC according to the measurement requirement, the base station at the network side may release the PUR associated with the PUR search space window.

According to a specific implementation, the base station at the network side may also receive indication information uploaded by the UE, the indication information is used for indicating that the terminal starts an intra-frequency/inter-frequency measurement. After that, the base station at the network side may know that even if a next SMTC and the PUR search space window overlap in time domain, the UE may perform the intra-frequency/inter-frequency measurement during the next SMTC period.

According to another specific implementation, before determining whether the PUR search space window and the SMTC overlap in time domain, the network side may transmit configuration information, the configuration information includes a measurement gap, the measurement gap includes the SMTC. After that, the UE may perform the measurement according to the measurement requirement when the measurement gap and the PUR search space window overlap in time domain.

Those skilled in the art should understand that S201 and S202 may be regarded as executions corresponding to S101 and S102 in the above-mentioned embodiment as shown in FIG. 1, and the two are complementary to each other in the specific realization principle and logic. Therefore, references of principles involved in this embodiment may be made to the relevant description of the embodiment shown in FIG. 1, which is not be repeated here.

The following describes in detail with specific embodiments.

Embodiment one: the SMTC overlapping with the PUR search space window in time domain is not used for a measurement.

Figure 3:
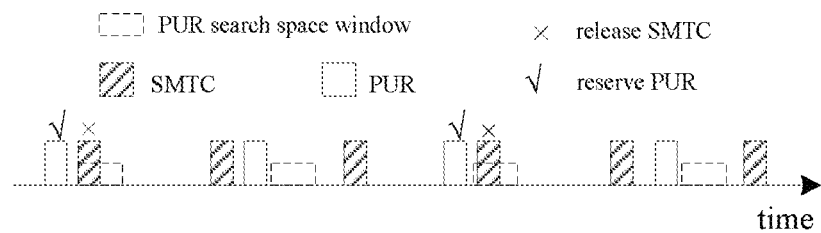
FIG. 3 schematically illustrates a flowchart of a method for processing a resource conflict according to a specific implementation manner of an embodiment of the present disclosure.

FIG. 3 schematically illustrates a flowchart of a method for processing a resource conflict according to a specific implementation manner of an embodiment of the present disclosure. Referring to the FIG. 3, when the PUR search space window (indicated by the dotted blank grid in FIG. 3) overlaps with the SMTC (indicated by the diagonal stripes in FIG. 3), the overlapping SMTC is not used for the measurement (the "x" in FIG. 3 means abandoning the measurement in the SMTC time window). Therefore, the UE may normally use a Preconfigure Uplink resource (that is, PUR, which is indicated by a solid line blank grid in FIG. 3; and use "√" to indicate that the PUR resource is an effective resource) to transmit data, and the UE may receive information such as a downlink signaling in the PUR search space window.

Embodiment two: a PUR corresponding to a PUR search space window overlapping with the SMTC in time domain is invalid.

Figure 4:
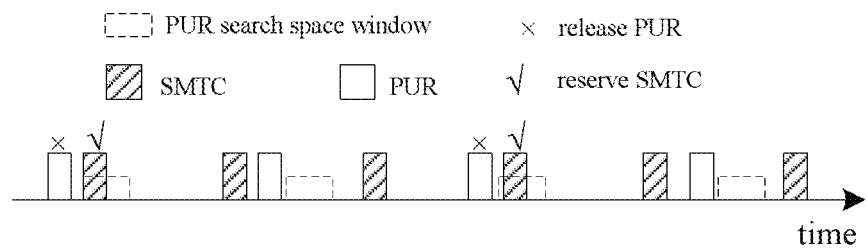
FIG. 4 schematically illustrates a flowchart of a method for processing a resource conflict according to another specific implementation manner of an embodiment of the present disclosure.

FIG. 4 schematically illustrates a flowchart of a method for processing a resource conflict according to a specific implementation manner of an embodiment of the present disclosure. Referring to the FIG. 4, when the PUR search space window (indicated by the dotted blank grid in FIG. 4) overlaps with the SMTC (indicated by the diagonal stripes in FIG. 4), the network allows the UE to perform a measurement in the SMTC. Correspondingly, the PUR search space window overlapping with the SMTC no longer transmits information such as a downlink signaling. A PUR associated with the PUR search space window cannot be used for data transmission, and the UE may release the PUR. A base station at the network side (such as gNB) does not need to receive data on the PUR. Wherein, in FIG. 4, "x" indicates that the UE releases the PUR; "√" indicates that the SMTC is reserved, and the UE is allowed to perform the measurement in the SMTC.

Embodiment three: when an intra-frequency/inter-frequency measurement condition is satisfied, and a PUR corresponding to a PUR search space window overlapping with the SMTC in time domain is invalid.

Figure 5:
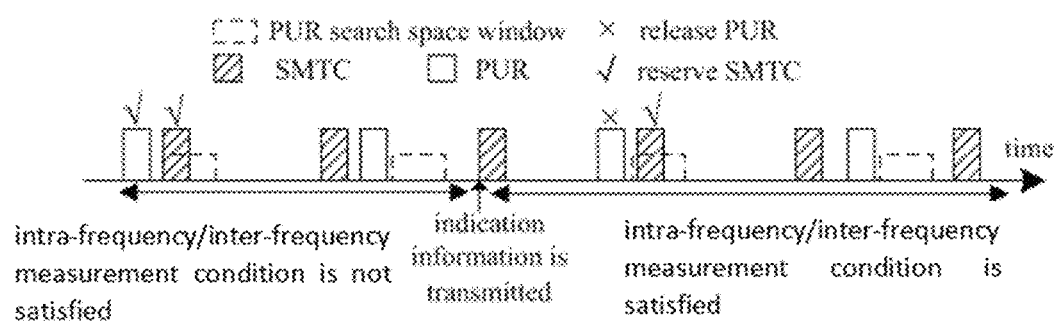
FIG. 5 schematically illustrates a flowchart of a method for processing a resource conflict according to another specific implementation manner of an embodiment of the present disclosure.

FIG. 5 schematically illustrates a flowchart of a method for processing a resource conflict according to a specific implementation manner of an embodiment of the present disclosure. Referring to the FIG. 5, when the PUR search space window (indicated by the dotted blank grid in FIG. 5) overlaps with the SMTC (indicated by the diagonal stripes in FIG. 5), and the intra-frequency/inter-frequency measurement condition is satisfied, the network allows the UE to perform a measurement in the SMTC. The intra-frequency/inter-frequency measurement condition being satisfied means that a channel quality of a frequency point where a radio resource is located is lower than a preset threshold. For example, in the NR system, the intra-frequency/inter-frequency measurement condition being satisfied means that a signal quality of a serving cell is lower than an intra-frequency measurement threshold/inter-frequency measurement threshold.

Those skilled in the art should understand that in an idle/inactive state, an intra-frequency/inter-frequency measurement activity of a UE is subject to a measurement criteria, and "/" means or. The UE has an opportunity to perform the intra-frequency/inter-frequency measurement only when the UE meets the intra-frequency/inter-frequency measurement condition. To solve the time domain conflict between the measurement activity and the PUR search space window, when the UE meets the intra-frequency/inter-frequency measurement condition, the UE may transmit the indication information which is used for informing the network that the UE may perform the intra-frequency/inter-frequency measurement in the SMTC overlapping with the PUR search space window in time domain. Correspondingly, the PUR associated with the PUR search space window overlapping with the SMTC in time domain is invalid, the UE and the network may release the PUR (in FIG. 5, "x" indicates that the PUR is released).

Continuing to refer to FIG. 5, when the PUR search space window and the SMTC overlap in time domain, and the intra-frequency/inter-frequency measurement condition is not satisfied, the UE may perform a serving cell measurement in the SMTC overlapping with the PUR search space window, and when there is uplink data to be transmitted, the UE may transmit the uplink data to be transmitted based on the PUR associated with the PUR search space window. Wherein, "√" in FIG. 5 indicates that the SMTC is reserved for measurement in the SMTC.

Embodiment four: when an intra-frequency/inter-frequency measurement condition is satisfied, and a SMTC overlapping with a PUR search space window in time domain cannot be used for a measurement.

Figure 6:
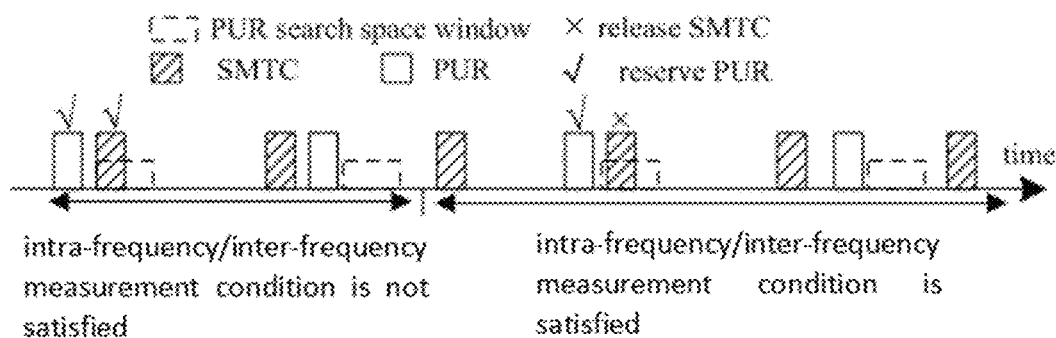
FIG. 6 schematically illustrates a flowchart of a method for processing a resource conflict according to another specific implementation manner of an embodiment of the present disclosure.

FIG. 6 schematically illustrates a flowchart of a method for processing a resource conflict according to another specific implementation manner of an embodiment of the present disclosure. Referring to the FIG. 6, when the PUR search space window (indicated by the dotted blank grid in FIG. 6) overlaps with the SMTC (indicated by the diagonal stripes in FIG. 6), even if the intra-frequency/inter-frequency measurement condition is satisfied, the UE cannot perform the measurement in the SMTC. That is, regardless of whether the UE meets the intra-frequency/inter-frequency measurement condition, during the SMTC overlapping with the PUR search space window in time domain, if the UE has the data to be transmitted to the base station at the network side, the UE does not perform the measurement.

When the PUR search space window and the SMTC overlap in time domain, if the UE has uplink data to be transmitted, the UE may transmit the uplink data to be transmitted in the PUR corresponding to the PUR search space window overlapping with the SMTC in time domain. In the FIG. 6, "x" indicates that the PUR is reserved, so that the uplink data to be transmitted can be transmitted in the resource; "√" indicates that the SMTC is abandoned and not used for the measurement. Otherwise, if the UE does not have uplink data to be transmitted and does not use the PUR associated with the PUR search space window overlapping with the SMTC in time domain, when the UE has a measurement requirement, the UE may perform the measurement in the SMTC time window overlapping with the PUR search space window in time domain.

Embodiment five: a measurement gap is introduced, and the PUR corresponding to the PUR search space window overlapping with the measurement gap in time domain is not used for data transmission.

Figure 7:
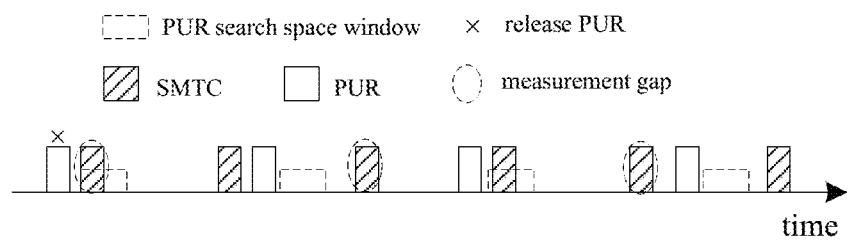
FIG. 7 schematically illustrates a flowchart of a method for processing a resource conflict according to another specific implementation manner of an embodiment of the present disclosure.

Specifically, the network side may add a measurement gap in the PUR configuration for the UE in advance, and the measurement gap includes at least one SMTC. FIG. 7 schematically illustrates a flowchart of a method for processing a resource conflict according to another embodiment of the present disclosure. Referring to FIG. 7, when the measurement gap and the PUR search space window overlap in time domain, the UE does not transmit the uplink data in the PUR corresponding to the PUR search space window overlapping with the measurement gap in time domain. Meanwhile, the PUR can be released (indicated by "x" in FIG. 7).

Continuing to refer to FIG. 7, when a SMTC which is not included in the measurement gap overlaps with the PUR search space window, the UE may also transmit the uplink data in the PUR associated with the PUR search space window, and may perform the measurement during the SMTC.

Continuing to refer to FIG. 7, when the measurement gap does not overlap with the PUR search space window in time domain, but other SMTCs which are not in the measurement gap overlap with the PUR, the UE may still transmit the uplink data in the PUR associated with the PUR search space window, and may perform the measurement during other SMTCs.

For more details about the working principles and working modes of the specific embodiments in FIG. 3 to FIG. 7, reference may be made to the relevant descriptions in FIG. 1, which will not be repeated here.

According to the embodiments of the present disclosure, the UE and the network can reach an agreement when the PUR search space window conflicts with the SMTC, the conflict between the PUR search space window and the SMTC can be solved, and the waste of the PUR can be avoided.

Figure 8:
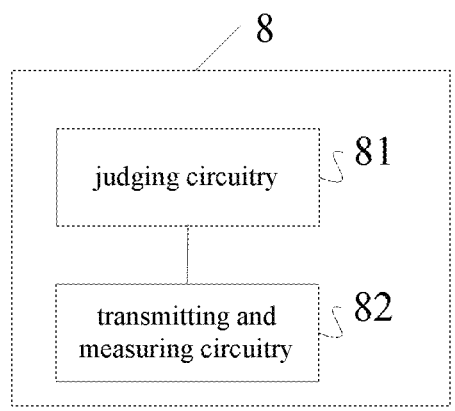
FIG. 8 schematically illustrates a structural diagram of a device for processing a resource conflict according to an embodiment of the present disclosure.

FIG. 8 schematically illustrates a structural diagram of a device for processing a resource conflict according to an embodiment of the present disclosure. The device 8 for processing a resource conflict may be configured to implement process shown in FIG. 1, and FIG. 3 to FIG. 7, which is executed by a terminal side.

Specifically, the device 8 for processing a resource conflict may includes: a judging circuitry 81 which is adapted to determine whether a Preconfigure Uplink Resource (PUR) search space window and a SS block based RRM Measurement Timing Configuration (SMTC) overlap in time domain; and a transmitting and measuring circuitry 82 which is adapted to transmit uplink data to be transmitted through a PUR associated with the PUR search space window when there is uplink data to be transmitted, in response to the PUR search space window and the SMTC overlapping in time domain; or, adapted to perform a measurement in the SMTC according to a measurement requirement, in response to the PUR search space window and the SMTC overlapping in time domain.

For more details about the working principles and working modes of the device 8 for processing a resource conflict, reference may be made to the relevant descriptions in FIG. 1, and FIG. 3 to FIG. 7, which will not be repeated here.

Figure 9:
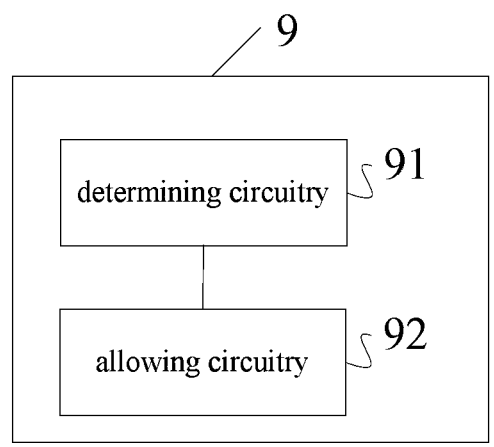
FIG. 9 schematically illustrates a structural diagram of a device for processing a resource conflict according to another embodiment of the present disclosure.

FIG. 9 schematically illustrates a structural diagram of a device for processing a resource conflict according to another embodiment of the present disclosure. The device 9 for processing a resource conflict may be configured to implement process shown in FIG. 2 to FIG. 7, which is executed by a base station, such as a NR gNB.

Specifically, the device 9 for processing a resource conflict may includes: a determining circuitry 91 which is adapted to determine whether a Preconfigure Uplink Resource (PUR) search space window and a SS block based RRM Measurement Timing Configuration (SMTC) overlap in time domain; and an allowing circuitry 92 which is adapted to allow a terminal to transmit uplink data to be transmitted through a PUR associated with the PUR search space window, in response to the PUR search space window and the SMTC overlapping in time domain; or adapted to allow the terminal to perform a measurement in the SMTC according to a measurement requirement, in response to the PUR search space window and the SMTC overlapping in time domain.

For more details about the working principles and working modes of the device 9 for processing a resource conflict, reference may be made to the relevant descriptions in FIG. 2 to FIG. 7, which will not be repeated here.

In an embodiment of the present disclosure, a storage medium having computer instructions stored therein is provided, wherein once the computer instructions are executed, the method shown in FIG. 1 or FIG. 2 can be performed. In some embodiment, the storage medium includes a computer-readable storage medium, such as a non-volatile memory or a non-transitory memory. The storage medium may also include a ROM, a RAM, a disk, an optical disk, or the like.

In an embodiment of the present disclosure, a terminal including a memory and a processor is provided, wherein the memory has computer instructions stored therein, and the method shown in FIG. 1, and FIG. 3 to FIG. 7 can be performed, once the processor executes the computer instructions. In some embodiment, the terminal may interact with a base station and other terminals, specifically, the terminal may be an NR terminal.

In an embodiment of the present disclosure, a base station including a memory and a processor is provided, wherein the memory has computer instructions stored therein, and the method shown in FIG. 2 to FIG. 7 can be performed, once the processor executes the computer instructions. Specifically, the base station may be an NR base station.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for processing a resource conflict, comprising:
   determining whether a Preconfigure Uplink Resource (PUR) search space window and a Synchronization Signal Block (SSB) based Radio Resource Management (RRM) Measurement Timing Configuration (SMTC) overlap in time domain; and
   in response to the PUR search space window and the SMTC overlapping in time domain, transmitting uplink data to be transmitted through a PUR associated with the PUR search space window when there is uplink data to be transmitted; or, in response to the PUR search space window and the SMTC overlapping in time domain, performing a measurement in the SMTC according to a measurement requirement.

2. The method according to claim 1, wherein the measurement cannot be performed in the SMTC, when transmitting the uplink data to be transmitted through the PUR associated with the PUR search space window.

3. The method according to claim 1, wherein said performing the measurement in the SMTC according to the measurement requirement comprises:
   performing the measurement in the SMTC according to the measurement requirement, and determining that the PUR associated with the PUR search space window is an invalid resource.

4. The method according to claim 1, wherein said in response to the PUR search space window and the SMTC overlapping in time domain, transmitting the uplink data to be transmitted through the PUR associated with the PUR search space window when there is uplink data to be transmitted comprises:

in response to the PUR search space window and the SMTC overlapping in time domain, and an intra-frequency/inter-frequency measurement condition being satisfied, transmitting the uplink data to be transmitted through the PUR associated with the PUR search space window and an intra-frequency/inter-frequency measurement cannot be performed when there is uplink data to be transmitted.

5. The method according to claim 1, wherein said in response to the PUR search space window and the SMTC overlapping in time domain, performing the measurement in the SMTC according to the measurement requirement comprises:

in response to the PUR search space window and the SMTC overlapping in time domain, and an intra-frequency/inter-frequency measurement condition being satisfied, performing the measurement in the SMTC according to the measurement requirement.

6. The method according to claim 5, wherein before performing the measurement in the SMTC according to the measurement requirement, the method further comprises:

transmitting indication information in response to the intra-frequency/inter-frequency measurement condition being satisfied, wherein the indication information is used for indicating that a terminal starts the intra-frequency/inter-frequency measurement.

7. The method according to claim 6, wherein before determining whether the PUR search space window and the SMTC overlap in time domain, the method further comprises:

receiving configuration information of the PUR, wherein the configuration information comprises a measurement gap, the measurement gap comprises the SMTC;

said in response to the PUR search space window and the SMTC overlapping in time domain, performing the measurement in the SMTC according to the measurement requirement comprises:

in response to the PUR search space window and the measurement gap overlapping in time domain, performing the measurement in the SMTC according to the measurement requirement, and determining that the PUR associated with the PUR search space window is an invalid resource.

8. The method according to claim 5, wherein before determining whether the PUR search space window and the SMTC overlap in time domain, the method further comprises:

receiving configuration information of the PUR, wherein the configuration information comprises a measurement gap, the measurement gap comprises the SMTC;

said in response to the PUR search space window and the SMTC overlapping in time domain, performing the measurement in the SMTC according to the measurement requirement comprises:

in response to the PUR search space window and the measurement gap overlapping in time domain, performing the measurement in the SMTC according to the measurement requirement, and determining that the PUR associated with the PUR search space window is an invalid resource.

9. A method for processing a resource conflict, comprising:

determining whether a Preconfigure Uplink Resource (PUR) search space window and a Synchronization Signal Block (SSB) based Radio Resource Management (RRM) Measurement Timing Configuration (SMTC) overlap in time domain; and in response to the PUR search space window and the SMTC overlapping in time domain, allowing a terminal to transmit uplink data to be transmitted through a PUR associated with the PUR search space window; or, in response to the PUR search space window and the SMTC overlapping in time domain, allowing the terminal to perform a measurement in the SMTC according to a measurement requirement.

10. The method according to claim 9, wherein said allowing the terminal to perform the measurement in the SMTC according to the measurement requirement comprises:

allowing the terminal to perform the measurement in the SMTC according to the measurement requirement, and releasing the PUR associated with the PUR search space window.

11. The method according to claim 10, further comprising: receiving indication information, wherein the indication information is used for indicating that the terminal starts an intra-frequency/inter-frequency measurement.

12. The method according to claim 11, wherein before determining whether the PUR search space window and the SMTC overlap in time domain, the method further comprises:

transmitting configuration information of the PUR, wherein the configuration information comprises a measurement gap, the measurement gap comprises the SMTC.

13. The method according to claim 10, wherein before determining whether the PUR search space window and the SMTC overlap in time domain, the method further comprises:

transmitting configuration information of the PUR, wherein the configuration information comprises a measurement gap, the measurement gap comprises the SMTC.

14. A non-transitory storage medium storing one or more programs, the one or more programs comprising computer instructions, which, when executed by a processor, cause the processor to:

determine whether a Preconfigure Uplink Resource (PUR) search space window and a Synchronization Signal Block (SSB) based Radio Resource Management (RRM) Measurement Timing Configuration (SMTC) overlap in time domain; and in response to the PUR search space window and the SMTC overlapping in time domain, transmit uplink data to be transmitted through a PUR associated with the PUR search space window when there is uplink data to be transmitted; or, in response to the PUR search space window and the SMTC overlapping in time domain, perform a measurement in the SMTC according to a measurement requirement.

15. The non-transitory storage medium according to claim 14, wherein the measurement cannot be performed in the SMTC, when transmitting the uplink data to be transmitted through the PUR associated with the PUR search space window.

16. The non-transitory storage medium according to claim 14, wherein said performing the measurement in the SMTC according to the measurement requirement comprises:
performing the measurement in the SMTC according to the measurement requirement, and determining that the PUR associated with the PUR search space window is an invalid resource.

17. The non-transitory storage medium according to claim 14, wherein said in response to the PUR search space window and the SMTC overlapping in time domain, transmitting the uplink data to be transmitted through the PUR associated with the PUR search space window when there is uplink data to be transmitted comprises:
in response to the PUR search space window and the SMTC overlapping in time domain, and an intra-frequency/inter-frequency measurement condition being satisfied, transmitting the uplink data to be transmitted through the PUR associated with the PUR search space window and an intra-frequency/inter-frequency measurement cannot be performed when there is uplink data to be transmitted.

18. The non-transitory storage medium according to claim 14, wherein said in response to the PUR search space window and the SMTC overlapping in time domain, performing the measurement in the SMTC according to the measurement requirement comprises:
in response to the PUR search space window and the SMTC overlapping in time domain, and an intra-frequency/inter-frequency measurement condition being satisfied, performing the measurement in the SMTC according to the measurement requirement.

19. The non-transitory storage medium according to claim 18, wherein before performing the measurement in the SMTC according to the measurement requirement, further comprising:
transmitting indication information in response to the intra-frequency/inter-frequency measurement condition being satisfied, wherein the indication information is used for indicating that a terminal starts the intra-frequency/inter-frequency measurement.

20. The non-transitory storage medium according to claim 18, wherein before determining whether the PUR search space window and the SMTC overlap in time domain, further comprising:
receiving configuration information of the PUR, wherein the configuration information comprises a measurement gap, the measurement gap comprises the SMTC;
said in response to the PUR search space window and the SMTC overlapping in time domain, perform the measurement in the SMTC according to the measurement requirement comprises:
in response to the PUR search space window and the measurement gap overlapping in time domain, performing the measurement in the SMTC according to the measurement requirement, and determining that the PUR associated with the PUR search space window is an invalid resource.

* * * * *